(12) United States Patent
Workman et al.

(10) Patent No.: US 8,722,414 B2
(45) Date of Patent: May 13, 2014

(54) DEVICE AND METHOD FOR THE CONTROL OF CHEMICAL PROCESSES

(75) Inventors: Victoria Louise Workman, Cardiff (GB); Robert Huw Davis, Mid Glamorgan (GB); Daniel David Palmer, Cardiff (GB)

(73) Assignee: Q Chip Limited, Cardiff (GB)

( * ) Notice: Subject to any disclaimer, the term of this patent is extended or adjusted under 35 U.S.C. 154(b) by 964 days.

(21) Appl. No.: 12/158,232

(22) PCT Filed: Dec. 20, 2006

(86) PCT No.: PCT/GB2006/004830
§ 371 (c)(1),
(2), (4) Date: Sep. 8, 2008

(87) PCT Pub. No.: WO2007/072002
PCT Pub. Date: Jun. 28, 2007

(65) Prior Publication Data
US 2009/0054640 A1 Feb. 26, 2009

(30) Foreign Application Priority Data
Dec. 20, 2005 (GB) .................................. 0525951.0

(51) Int. Cl.
*G01N 1/00* (2006.01)
*A61K 9/127* (2006.01)
(52) U.S. Cl.
USPC ............................................ 436/53; 436/180
(58) Field of Classification Search
USPC .......................................... 436/53, 176, 180
See application file for complete search history.

(56) References Cited

U.S. PATENT DOCUMENTS

2005/0032240 A1* 2/2005 Lee et al. ...................... 436/180

FOREIGN PATENT DOCUMENTS

| CH | 563807 | | 7/1975 |
| EP | 1 358 931 | A | 11/2003 |
| EP | 1481 723 | A | 12/2004 |
| GB | 2 395 196 | A | 5/2004 |

(Continued)

OTHER PUBLICATIONS

Atencia, Javier et al.: "Controlled microfluidic interfaces", *Nature* 437, pp. 648-655 (Sep. 29, 2005).
Surmeian, Mariana et al.: "Three-Layer Flow Membrane System on a Microchip for Investigation of Molecular Transport", *Anal. Chem.*, 2002, 74, pp. 2014-2020.

(Continued)

*Primary Examiner* — Paul Hyun
(74) *Attorney, Agent, or Firm* — Frommer Lawrence & Haug LLP; Ronald R. Santucci

(57) ABSTRACT

The present invention provides a method of controlling a chemical process, the method comprising the steps of: (i) providing a laminar flow of a first fluid, the first fluid providing a first reagent or one or more precursor thereof), a laminar flow of a second fluid, the second fluid providing a second reagent (or one or more precursor thereof) and a laminar flow of barrier fluid; and (ii) causing the first and barrier fluids to contact one another so that the barrier fluid forms a barrier between the first reagent (or one or more precursor thereof) and the second reagent (or one or more precursor thereof) wherein step (ii) comprises forming segments of first fluid encased or sandwiched by barrier fluid, the segments being surrounded by the second fluid, and the barrier fluid is permeable to one or both of the first and second reagents. Devices for performing the method of the present invention are also provided.

17 Claims, 6 Drawing Sheets

(56) References Cited

FOREIGN PATENT DOCUMENTS

| | | |
|---|---|---|
| JP | 2005-046650 A | 2/2005 |
| WO | WO 03/045541 A | 6/2003 |
| WO | WO 2004/002627 | 1/2004 |
| WO | WO 2004/038363 A | 5/2004 |
| WO | WO 2004/091763 A | 10/2004 |
| WO | WO 2005/103106 | 11/2005 |
| WO | WO 2006/082351 A | 8/2006 |

OTHER PUBLICATIONS

Maruyama, Tatsuo et al.: "Liquid Membrane Operations in a Microfluidic Device for Selective Separation of Metal Ions", *Anal. Chem.*, 2004, 76, pp. 4495-4500.

\* cited by examiner

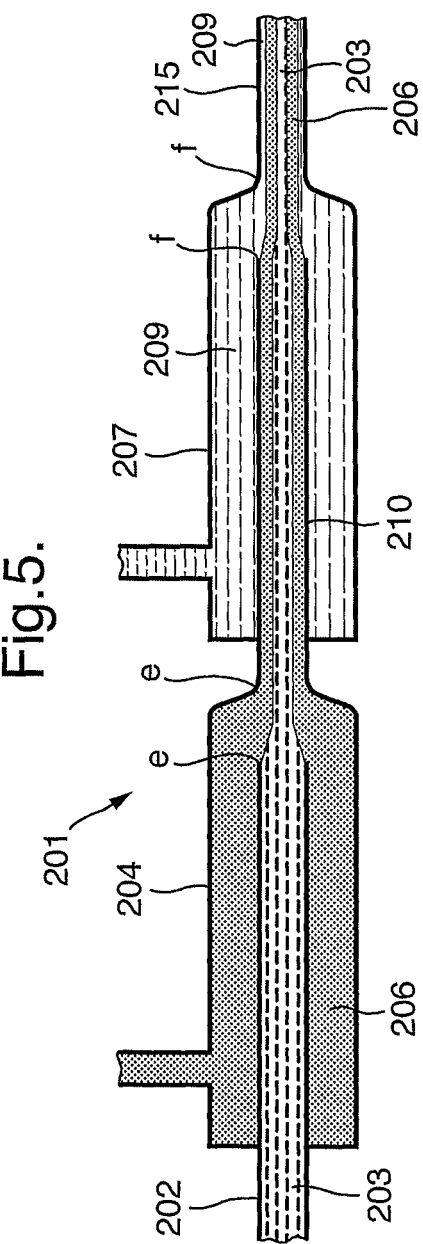

DEVICE AND METHOD FOR THE CONTROL OF CHEMICAL PROCESSES

This application is a 371 of PCT/GB2006/004830 filed on Dec. 20, 2006, published on Jun. 28, 2007 under publication number WO 2007/072002 A1 which claims priority benefits from British Patent Application Number 0525951.0 filed Dec. 20, 2005, the disclosure of which is hereby incorporated by reference.

The present invention relates to methods of performing and/or controlling chemical processes (preferably, but not exclusively, chemical reactions) and devices for doing the same.

The control of chemical processes (such as chemical reactions) has often proved to be difficult, especially when such processes are rapid. For example, there are some circumstances in which it would be undesirable for two reactive species to come together in an uncontrolled manner, for example, if the reaction is dangerous.

Certain microfluidic devices are known and have been used for the creation of segments of a first fluid disposed in a flow of second fluid.

The device and method of the present invention address one or more of these problems.

In accordance with a first aspect of the present invention, there is provided a microfluidic device, having
a first delivery conduit for delivering a first fluid providing a first reagent (or one or more precursors thereof),
first and second lateral delivery conduits confluent with the first reagent delivery conduit at a junction region, for delivering a second fluid providing a second reagent (or one or more precursors thereof),
wherein the first and second lateral delivery conduits each comprise an inlet for the second reagent and an inlet for a barrier fluid, and the device is so arranged that it permits the barrier fluid to form a barrier between the first reagent (or one or more precursors thereof) and the second reagent (or one or more precursors thereof).

The term "fluid" as used in the present application is intended to cover liquids, gases and supercritical fluids. It is preferred that the fluid is a liquid. The reference to "reagent" in the terms "first reagent" and "second reagent" does not mean that the first and second reagents necessarily react with each other. The term "reagent" in the terms "first reagent" and "second reagent" also includes first species and second species that undergo a chemical process other than a reaction. For example, two species that, on contact with one another, cause crystallisation to occur. In this case, one of the first and second reagents may be an anti-solvent and the other may be a species that is caused to crystallise in the presence of the anti-solvent.

The device is a microfluidic device and hence allows very small volumes of material to be reacted together in a controlled manner. This potentially allows dangerous reactions to be studied, performed or controlled. The conduits in such microfluidic devices typically have widths of less than 2 mm, preferably less than 1 mm and more preferably from 0.1 to 0.5 mm. The depths of the conduits are typically less than 2 mm, preferably less than 1 mm and more preferably from 0.1 mm to 0.5 mm. The flow rates of the fluids will depend, inter alia, on the cross-sectional area of the conduits, and the preferred values given here relate to conduits having depths less than 1 mm and widths less than 1 mm. The flow rate, for example, of the first fluid through the first reagent delivery conduit may advantageously be from about 0.02 to 5 ml/hour, more preferably be from about 0.1 to 2 ml/hour. The flow rate of the barrier fluid may be from about 0.2 to 15 ml/hour, preferably from about 1 to 3 ml/hour. The flow rate of the second fluid may be from about 0.4 to 25 ml/hour, preferably from about 2 to 5 ml/hour.

It is preferred that the flow rate of the second fluid is greater than the flow rate of the barrier fluid which is, in turn, greater than the flow rate of the first fluid.

The terms "first fluid providing a first reagent" and "second fluid providing a second reagent" include the possibility that the first and/or second fluids themselves may be the first and/or second reagents respectively. Alternatively, the first reagent may be contained within the first fluid; for example, the first reagent may be dissolved, or dispersed, in the first fluid. It will be appreciated that references herein to the first reagent being contained within the first fluid include the case where a precursor of the first reagent is contained within the first fluid. Likewise, the second reagent may be contained within the second fluid; for example, the second reagent may be dissolved, or dispersed, in the second fluid, or there may be contained in the second fluid a precursor of the reagent.

A precursor of the first reagent (or second reagent) includes a species that, over time, or through contact with another species, forms the first reagent (or second reagent).

As mentioned above, the device is so arranged to permit the barrier fluid to form a barrier between the first reagent (or one or more precursor thereof) and the second reagent (or one or more precursor thereof). This is achieved by arrangement of the inlets for the barrier fluid and second fluid, coupled with the arrangement of the junction.

For example, an inlet for a barrier fluid may be associated with a first side of the respective lateral delivery conduit, and the corresponding inlet for a second reagent may be associated with the other side of the respective lateral delivery conduit. In this arrangement, the barrier fluid may be introduced into the first side of the respective lateral delivery conduit and the second fluid may be introduced into the other side of the lateral delivery conduit. In this case, it is preferable for the first side of the respective lateral delivery conduit to join the first delivery conduit upstream of the other side of the respective delivery conduit. This geometry is effective for facilitating the first fluid to be encased or sandwiched by the barrier fluid.

The device is typically a unitary device machined from a low surface energy polymer such as polytetrafluoroethylene (PTFE). Pumps are typically used to cause the various fluids to flow through the device.

The barrier fluid permits control of the reaction or process that would occur between the first and second reagents by controlling the way in which the first and second reagents come into contact with each other. Thus, the barrier fluid may be permeable to one or both of the first and second reagents (or their precursors as the case may be). In that manner, controlled passage of one or both of the reagents (or one or both of their precursors) through the barrier fluid is allowed so that the reaction or other process occurring between the two is controlled.

Alternatively, the barrier fluid may be substantially impermeable to one or both of the first and second reagents. In this way, the two reactive agents (or their precursors as the case may be) are kept apart, thus substantially preventing any adverse reaction or other process occurring between the two.

It is preferred that the first fluid is encased or sandwiched by the barrier fluid in the region of the junction. This may take the form of a cone of first fluid forming at the junction and being sandwiched or encased by barrier fluid. Such an arrangement may lead to the formation of beads or spherules of first fluid being encased by a layer of barrier fluid.

It is a particular advantage of the present invention that the device permits the barrier fluid to meet the first fluid from more than one side.

The barrier fluids carried by the first and second lateral delivery conduits may be mutually the same or different. Furthermore, the second fluids carried by the first and second lateral delivery conduits may be mutually the same or different.

The junction region may form or be provided with a constriction or other discontinuity for producing a flow of segments of first fluid encased or sandwiched by barrier fluid.

It is preferred that the device is provided with a functional conduit extending from the junction region for carrying the first and second reagent away. The functional conduit may be provided with a constriction or other discontinuity for producing a flow of segments of first fluid encased or sandwiched by barrier fluid. This is conveniently achieved if the first fluid is immiscible with the second fluid.

The functional conduit may be provided with an enlargement in cross-section downstream of the junction region. Such an enlargement may assist in the formation of substantially spherical segments of first fluid encased by barrier fluid. If the depth of the functional conduit downstream of the enlargement is 2a, then the enlargement in cross-section may be located at a distance of up to 5a (and preferably from 0.5a to 3a, more preferably 0.5a to 1.5a and most preferably about 1a) downstream of the junction region (preferably the downstream end of the junction region). Alternatively or additionally, if the width of the functional conduit downstream of the enlargement is 2a, then the enlargement in cross-section may be located at a distance of up to 5a (and preferably from 0.5a to 3a, more preferably 0.5a to 1.5a and most preferably about 1a) downstream of the junction region (preferably the downstream end of the junction region). Further alternatively or additionally, if the cross-sectional area of the functional conduit downstream of the enlargement is $4a^2$, then the enlargement in cross-section may be located at a distance of up to 5a (and preferably from 0.5a to 3a, more preferably 0.5a to 1.5a and most preferably about 1a) downstream of the junction region (preferably the downstream end of the junction region).

If the functional conduit is substantially circular in cross-section, then the diameter of the said conduit should replace the width or depth measurement mentioned above.

The cross-sectional area of the functional conduit downstream of the enlargement may be up to 5 times larger than the cross-sectional area of the functional conduit upstream of the enlargement.

It is preferred that the enlargement in cross-section is formed so as to create a drop or step in the functional conduit. This has been found to promote formation of segmented flow. If the depth of the functional conduit downstream of the enlargement is 2a, it is preferred that the drop or step is about 0.1a to 1a.

The functional conduit may be provided with a curve, bend or a plurality of curves or bends downstream of the junction region. Such a feature may help mixing and may increase the time taken for reagents to reach a device outlet.

The device may be a unitary device, or may be manufactured from a plurality of separate conduits which are fused or joined together.

The device may further comprise a plurality of inlet conduits associated with the first delivery conduit, at least two of the inlet conduits merging at a junction to form the first delivery conduit. Alternatively, at least two of the inlet conduits may be confluent with the first delivery conduit in an inlet conduit junction region. This allows different species to be introduced into the first delivery conduit separately. This may be important if those species are, for example, dangerous when mixed, or if mixing prior to introduction into the device is undesirable because a reaction between those two species occurs too quickly.

The first delivery conduit may comprise one or more bends. Such bends assist in mixing the contents of the conduit.

In accordance with a second aspect of the invention, there is provided a microfluidic device for controlling a process (preferably a reaction) between a first reagent and a second reagent, the device comprising a first delivery conduit for carrying a first fluid providing a first reagent (or one or more precursors thereof), first and second lateral conduits for carrying a barrier fluid, third and fourth lateral conduits for carrying a second fluid providing a second reagent (or one or more precursors thereof), the first and second lateral conduits confluent with the first delivery conduit in a junction region, from which extends a first encased flow conduit, the device (preferably the junction region) so arranged as to permit the barrier fluid to encase or sandwich the first fluid, wherein the third and fourth lateral conduits are confluent with the first encased flow conduit at a junction region, this junction region arranged so as to permit the barrier fluid to form a barrier between the first reagent (or one or more precursors thereof) and the second reagent (or one or more precursors thereof).

In accordance with a third aspect of the invention there is provided a microfluidic device for controlling a process (preferably a reaction) between a first reagent and a second reagent, the device comprising a first inner delivery conduit for carrying a first fluid providing a first reagent (or one or more precursors thereof), a first outer delivery conduit for carrying a barrier fluid the first outer delivery conduit and the first inner delivery conduit each having outlets in fluid communication with a first encased flow conduit, arranged so as to permit barrier fluid to encase or sandwich the first fluid in the first encased flow conduit, the first encased flow conduit forming a second inner delivery conduit extending inside a second outer delivery conduit for carrying a second fluid providing a second reagent (or one or more precursors thereof), the first encased flow conduit and the second outer delivery conduit each having outlets, arranged so as to permit the barrier fluid to form a barrier between the first reagent (or one or more precursors thereof) and the second reagent (or one or more precursors thereof).

Either of the junction arrangements of the second aspect of the present invention may be replaced by an inner-outer conduit arrangement as described in the third aspect of the present invention.

Therefore, in accordance with a fourth aspect of the present invention, there is provided a microfluidic device for controlling a process (preferably a reaction) between a first reagent and a second reagent, the device comprising an inner delivery conduit for delivering a first fluid providing a first reagent (or one or more precursors thereof)

an outer delivery conduit for delivering a barrier fluid, the outer delivery conduit and the inner delivery conduit each having outlets in fluid communication with a first encased flow conduit, arranged so as to permit barrier fluid to encase or sandwich the first fluid in the first encased flow conduit first and second lateral delivery conduits for delivering a second fluid providing a second reagent (or one or more precursors thereof), the first and second lateral delivery conduits confluent with the first encased flow conduit in a junction region, the junction region being arranged so as to permit the barrier fluid to form a barrier between the first reagent (or one or more precursors thereof) and the second reagent (or one or more precursors thereof).

In accordance with a fifth aspect of the present invention there is provided a microfluidic device for controlling a process (preferably a reaction) between a first reagent and a second reagent, the device comprising a first delivery conduit for delivering a first fluid providing a first reagent (or one or more precursor thereof), first and second lateral delivery conduits for delivering a barrier fluid, the first and second lateral delivery conduits confluent with the first delivery conduit at a junction region from which extends a first encased flow conduit, the junction region arranged so as to permit the barrier fluid to encase or sandwich the first fluid in the first encased flow conduit, the first encased flow conduit forming an inner conduit extending inside an outer delivery conduit for delivering a second fluid providing a second reagent (or one or more precursor thereof)

the first encased flow conduit and the outer delivery conduit each having outlets arranged so as to permit the barrier fluid to form a barrier between the first reagent (or one or more precursor thereof) and the second reagent (or one or more precursor thereof).

In accordance with a sixth aspect of the present invention there is provided a microfluidic device for controlling a process (preferably a reaction) between a first reagent and a second reagent, the device comprising a first inner delivery conduit for carrying a first fluid providing a first reagent (or one or more precursors thereof), a first outer delivery conduit for carrying a barrier fluid, a second outer delivery conduit for carrying a second fluid providing a second reagent (or one or more precursors thereof), the first inner delivery conduit being located inside the first outer delivery conduit and the first outer delivery conduit being located inside the second outer delivery conduit so as to permit the barrier fluid to form a barrier between the first reagent (or one or more precursors thereof) and the second reagent (or one or more precursors thereof).

The devices of the second, third, fourth, fifth and sixth aspects of the present invention may have those features described above with reference to the first aspect of the present invention.

In accordance with a seventh aspect of the present invention, there is provided a method of controlling a chemical process, the method comprising the steps of:

(i) providing a laminar flow of a first fluid, the first fluid providing a first reagent (or one or more precursors thereof), a laminar flow of a second fluid, the second fluid providing a second reagent (or one or more precursors thereof) and a laminar flow of barrier fluid; and (ii) causing the first and barrier fluids to contact one another so that the barrier fluid forms a barrier between the first reagent (or one or more precursors thereof) and the second reagent (or one or more precursors thereof).

The reference to "reagent" in the terms "first reagent" and "second reagent" does not mean that the first and second reagents necessarily react with each other. The term "reagent" in the terms "first reagent" and "second reagent" also includes first species and second species that undergo a chemical process other than a reaction. For example, two species that, on contact with one another, cause crystallisation to occur. In this case, one of the first and second reagents may be an antisolvent and the other may be a species that is caused to crystallise in the presence of the antisolvent.

The first reagent may be the first fluid itself. Likewise, the second reagent may be the second fluid itself. Alternatively, the first reagent may be contained within the first fluid; for example, the first reagent may be dissolved, or dispersed, in the first fluid. It will be appreciated that references herein to the first reagent being contained within the first fluid include the case where a precursor of the first reagent is contained within the first fluid. Likewise, the second reagent may be contained within the second fluid; for example, the second reagent may be dissolved, or dispersed, in the second fluid, or there may be contained in the second fluid a precursor of the reagent.

A precursor of the first reagent (or the second reagent) includes a species that, over time, or through contact with another species, forms the first reagent (or the second reagent). For example, step (i) may further comprise providing a laminar flow of a fourth fluid, preferably providing a precursor of the first or second reagent. In this case, it is further preferred that, for example, the first fluid provides a precursor of the first reagent, the precursor provided by the first fluid forming the first reagent when in the presence of the fourth fluid or the precursor provided by the fourth fluid. It is further preferred in this case that the laminar flow of the first fluid and the laminar flow of the fourth fluid are parallel laminar flows prior to step (ii), the first and fourth fluids being in contact with one another.

It is preferred that the method is a method of controlling a chemical reaction between the first reagent and the second reagent.

The term "laminar" is intended to encompass flows of fluids having a Reynolds number of less than 2000. Preferably, the Reynolds number is less than 1000, more preferably less than 500, even more preferably 10 or less, and most preferably 5 or less.

The method preferably comprises causing the first fluid to be encased or sandwiched by the barrier fluid. "Sandwiched" includes the first fluid being disposed between two portions or flows of barrier fluid.

The method may comprise encasing or sandwiching the first fluid with the barrier fluid prior to encasing or sandwiching the barrier fluid with the second fluid.

Alternatively, the method may comprise bringing the barrier fluid into contact with the second fluid before encasing or sandwiching the first fluid with the barrier fluid.

The barrier fluid permits control of the reaction or process that would occur between the first and second reagents by controlling the way in which the first and second reagents come into contact with each other. Thus, the barrier fluid may be permeable to one or both of the first and second reagents (or their precursors as the case may be). In that manner, controlled passage of one or both of the reagents (or one or both of their precursors) through the barrier fluid is allowed so that the reaction or other process occurring between the two is controlled.

Alternatively, the barrier fluid may be substantially impermeable to one or both of the first and second reagents. In this way, the two reactive agents (or their precursors as the case may be) are kept apart, thus substantially preventing any unwanted reaction between the two.

It is preferred that there is a concentration or diffusion gradient across the barrier fluid, the concentration or diffusion gradient controlling the rate of movement of the first or second reagent across the barrier fluid.

The method may further comprise the step of bringing the second and barrier fluids into contact with one another prior to step (ii). This is a convenient way of performing the present method and allows simple devices to put the method into effect.

Alternatively, the method may comprise the step of bringing the first and barrier fluids into contact with one another prior to bringing the second fluid into contact with the barrier fluid.

The method further comprises providing a plurality of laminar flows of barrier fluid. It is preferred that the laminar flows of barrier fluid contact the first fluid from more than one side.

The method preferably comprises providing a plurality of laminar flows of second fluid. It is preferred that the laminar flows of second fluid contact the barrier fluid from more than one side.

The provision of a plurality of laminar flows of one or more of the second and barrier fluids provides a convenient method for encasing or sandwiching the first fluid with barrier fluid.

Step (ii) may comprise forming segments of first fluid encased or sandwiched by barrier fluid. The segments may be substantially spherical in shape. In such a case, the barrier fluid would form a substantially spherical shell around the first fluid. Such segments may be surrounded by the second fluid. In such cases, it is preferred that the first fluid is immiscible with the second fluid. The method preferably comprises causing the first fluid to be encased or sandwiched by the barrier fluid prior to the formation of segments.

Alternatively, step (ii) may comprise forming parallel laminar flows of the first fluid, second fluid and barrier fluid. The parallel laminar flow of the first fluid may be encased by the barrier fluid. The method preferably comprises causing the first fluid to be encased or sandwiched by the barrier fluid prior to the formation of the parallel laminar flows.

The flow rates of the fluids will depend, inter alia, on the cross-sectional area of the conduits, and the preferred values given here relate to conduits having depths less than 1 mm and widths less than 1 mm. The flow rate, for example, of the first fluid in step (i) may advantageously be from about 0.02 to 5 ml/hour, more preferably be from about 0.1 to 2 ml/hour. The flow rate of the barrier fluid may be from about 0.2 to 15 ml/hour, preferably from about 1 to 3 ml/hour. The flow rate of the second fluid may be from about 0.4 to 25 ml/hour, preferably from about 2 to 5 ml/hour.

It is preferred that the flow rate of the second fluid is greater than the flow rate of the barrier fluid which is, in turn, greater than the flow rate of the first fluid.

It is preferred that the method comprises providing a device (preferably a microfluidic device) having a junction region in which the barrier fluid may be brought into contact with the first fluid, the junction being arranged to permit the barrier fluid to meet the first fluid from more than one side.

The method of the present invention may further comprise providing a device (preferably a microfluidic device) having a first reagent conduit, and first and second lateral reagent conduits, the first and second lateral reagent conduits being confluent with the first reagent conduit in a junction region. The first fluid may be introduced into the first reagent conduit, and the flow of barrier fluid (and optionally the flow of second fluid containing the second reagent) being introduced into the first and second lateral reagent conduits. It is preferred that the first fluid is encased or sandwiched by the barrier fluid in the junction region.

The method of the present invention may comprise providing a reactor device of the first, second, third, fourth, fifth or sixth aspects of the present invention.

The method of the present invention may be used in the control and performance of one or more of polymerisation reactions, acid-base reactions. For example, the first or second reagent may comprise hydrogen ions. In the case where the first or second reagent comprises hydrogen ions, the other of the first and second reagent may comprise anions, such as carbonate, hydrogen carbonate, hydroxide, halide, phosphate, hydrogen phosphate, alginate, nitrate, nitrite, chlorate, perchlorate, sulphite, persulphate and sulphate. The first or second reagents may comprise cationic or anionic precursors of polymers (such as alginate ions). One of the first and second reagents may comprise a cation, such as a metal cation (for example, sodium, potassium, calcium, magnesium, aluminium, lithium, iron (II), iron (III), copper (I), copper (II), cadmium, barium, tin, zinc, lead and manganese) or a non-metal cation (such as ammonium and hydrogen).

The first or second reagent may comprise a monomer capable of being polymerised by anionic initiators. Such monomers include methyl methacrylate, acrylonitrile and styrene. The other of the first and second reagent may comprise an anionic initiator, such as an alkyl/aryl lithium reagent, an alkali metal suspension, an aluminium alkyl, an organic radical anion or a Grignard reagent.

The first or second reagent may comprise a monomer capable of being polymerised by cationic initiators. Such monomers include isobutylene, 1,3-butadiene, vinyl ethers, para substituted styrene and alpha-methyl styrene. The other of the first and second reagent may comprise a cationic polymerisation initiator, such as boron trifluoride, ethereal boron trifluoride, titanium tetrachloride and a strong mineral acid.

The first and second reagents may comprise species which, when reacted together, undergo a precipitation reaction. One of the first and second reagents may comprise species which perform nucleophilic or electrophilic attack on the other of the first and second reagents. The first and second reagents may comprise species which undergo charge-transfer or coupling reactions.

It is preferable that the flow rate of one or more of the barrier fluid, first fluid and second fluid is changeable.

It is preferable that the barrier fluid is the same as the second fluid. The barrier fluid is, in this case, substantially devoid of the second reagent (or one or more precursor as the case may be).

The flow rate may be altered in dependence on observed properties of a product of the method (for example, the size of any segments or beads produced by the method).

The method of the present invention may be performed using only two flows, one flow comprising the first reagent and one flow comprising the second reagent, so long as there is a portion of the fluid defining the second flow that is substantially devoid of the second reagent. There is therefore provided in accordance a with an eighth aspect of the present invention a method of controlling a chemical process, the method comprising:

(i) providing a laminar flow of a first fluid, the first fluid providing a first reagent (or one or more precursor thereof) and a laminar flow of a second fluid, the second fluid providing a second reagent (or one or more precursor thereof); wherein the second fluid comprises a barrier region substantially devoid of the second reagent (or one or more precursor thereof) and (ii) causing the first and second fluids to contact one another so that the barrier region forms a barrier between the first reagent (or one or more precursor thereof) and the second reagent (or one or more precursor).

Those skilled in the art will recognise that the barrier region of this method is analogous to the barrier fluid of the seventh aspect of the present invention.

The method of the eighth aspect of the present invention may incorporate those features as described above with reference to the seventh aspect of the present invention.

The methods of the present invention may be put into effect using the devices of the present invention.

The invention will now be described by way of example only with reference to the following figures of which:

FIG. 5 is a schematic representation of a device in accordance with the third aspect of the present invention.

Figure 1:
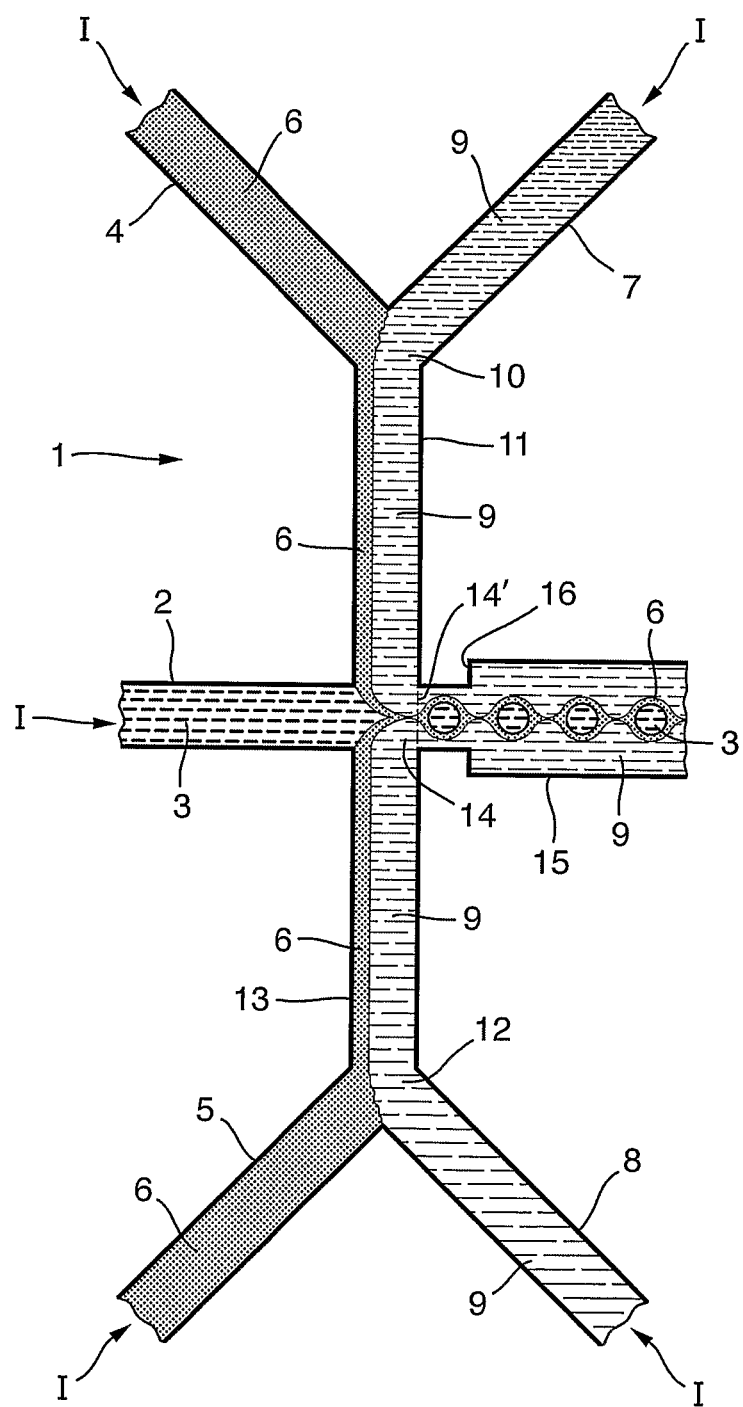
FIG. 1 is a schematic representation of a device in accordance with the first aspect of the present invention being used in accordance with a method in accordance with the present invention.

FIG. 1 shows a microfluidic reactor device in accordance with the first aspect of the present invention. The reactor device 1 comprises a first delivery conduit 2 for delivering a first fluid 3 providing a first reagent (not shown), and first 11 and second 13 lateral delivery conduits confluent with the first delivery conduit 2 at a junction region 14, for delivering a second fluid 9 providing a second reagent (not shown). The first 11 and second 13 lateral delivery conduits each comprise an inlet (I) for the second fluid and an inlet (I) for a barrier fluid 6, and the device is so arranged that it permits the barrier fluid 6 to form a barrier between the first reagent and the second reagent.

The operation of the device is now described in more detail with reference to FIG. 1. A first fluid 3 providing a first reagent is introduced into first delivery conduit 2.

The first reagent is potentially reactive with a second reagent which is provided with the second fluid 9. Barrier fluid 6 is introduced into first 4 and second 5 barrier fluid conduits via inlets (I). Likewise, second fluid 9 is introduced into first 7 and second 8 reagent fluid conduits. The flows of first, second and barrier fluid are substantially laminar. The respective barrier fluid conduits 4, 5 meet respective reagent fluid conduits 7, 8 at junctions 10, 12. Laminar flows of barrier fluid 6 and second fluid 9 are then urged along the first 11 and second 13 lateral delivery conduits as indicated in FIG. 1. The first 11 and second 13 lateral delivery conduits meet the first delivery conduit 2 at a junction region 14.

The junction region 14 acts as a flow constriction, and a cone-like or wedge-like formation of first fluid 3 is produced, with barrier fluid 6 encasing this formation. Droplets of first fluid 3, encased by barrier fluid 6 are formed in a flow of second fluid 9 in a functional conduit 15. Droplets are formed because first fluid 3 is immiscible with second fluid 9 and barrier fluid 6. These droplets are then transported along the functional conduit 15. The functional conduit 15 is provided with an enlargement 16 in cross-section a short distance downstream of the junction region 14. This short distance between the downstream end of the junction region denoted by 14' and the enlargement in cross-section is about half the depth of the functional conduit 15 downstream of the enlargement 16. This enlargement in cross-section promotes the formation of droplets. The enlargement 16 also produces a drop or step in the functional conduit 15; it is expected that the drop or step is beneficial to the formation of droplets. In the functional conduit 15, one (or alternatively none or both) of the first and second reagents is transported across the barrier fluid 6 so that the first and second reagents come into reactive contact with one another and undergo a reaction. The composition and thickness of the barrier fluid 6 around the droplets of first fluid 3 will help to control the reaction between the first and second reagents.

Those skilled in the art will recognise that the wedge or cone-like formation mentioned above is not a static structure; it is a dynamic structure. A cone or wedge shape of first fluid 3 appears to be formed at the junction.

Figure 2:
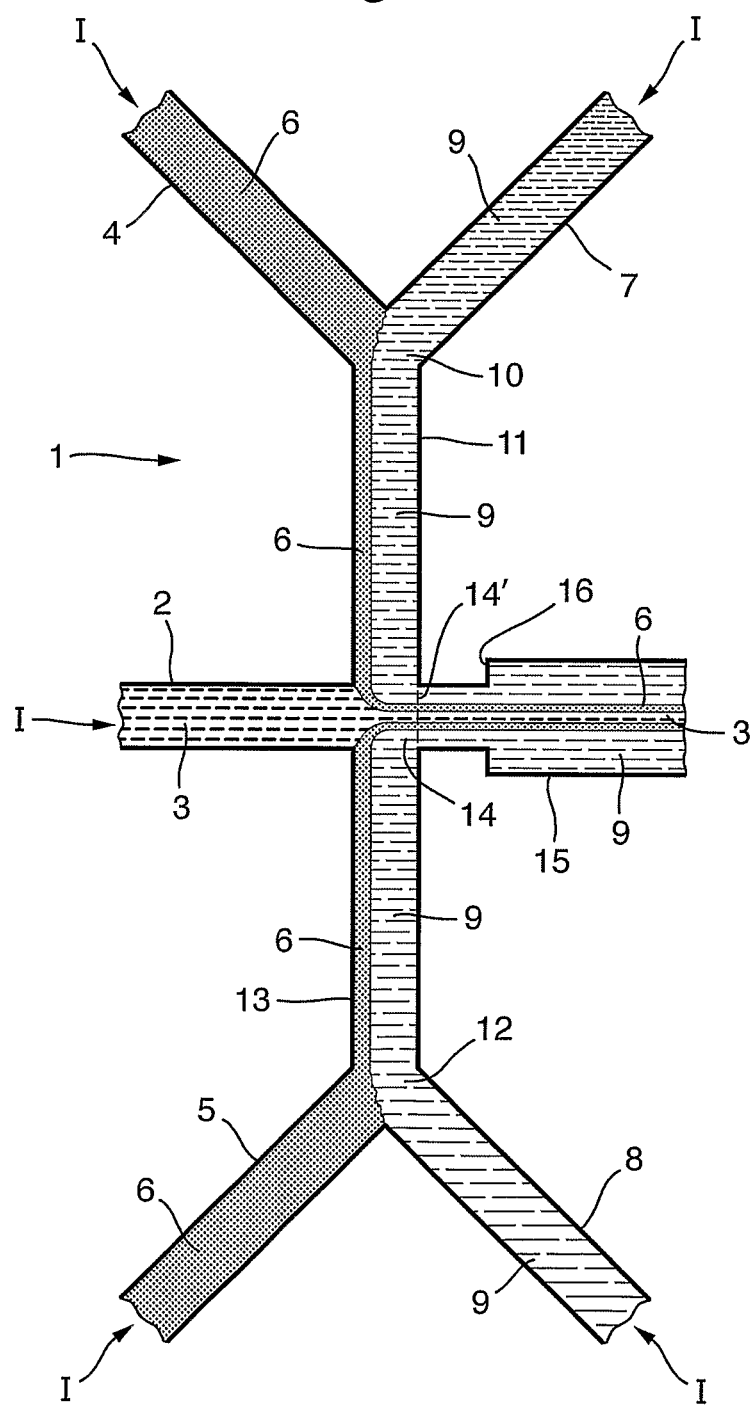
FIG. 2 is a schematic representation of a device in accordance with the first aspect of the present invention being used in accordance with a method in accordance with the present invention.

The device of FIG. 1 may be used to control and perform reactions when the first fluid 3, second fluid 9 and barrier fluid 6 are miscible. Such a method is shown in FIG. 2. The respective fluids are introduced into the device as described with reference to FIG. 1. At junction region 14, there is a constriction of flow of the first fluid 3. However, due to the miscibility of the respective fluids, droplets of first fluid 3 are not formed. In this case, parallel flows of first fluid 3, barrier fluid 6 and second fluid 9 are formed in the functional conduit 15. The first fluid 3 is encased or sandwiched by the barrier fluid 6, the barrier fluid forming a barrier between the first fluid 3 and the second fluid 9. In the functional conduit 15, one (or alternatively none or both) of the first and second reagents is transported across the barrier fluid 6 so that the first and second reagents come into reactive contact with one another so that a reaction takes place. The composition and thickness of the barrier fluid 6 around the first fluid 3 will help to control the reaction between the first and second reagents.

The device of FIG. 1 may be provided with heaters or coolers which may be selectively placed or selectively operable so as to heat or cool selected parts of the device (for example, to heat or cool the functional conduit 15, and not any other conduit). For example, if two reagents undergo a strongly exothermic reaction, it may be desirable to provide a cooler (such as a Peltier cooler) for the functional conduit 15.

The respective fluids may be introduced into their respective conduits by a pump.

The conduits are typically formed by machining or milling channels from a block of low energy material, such as polytetrafluoroethylene (often known as PTFE). Other known methods of removing material from a substrate may be used.

Such channels or conduits are typically less than 1000 µm wide. The conduits may have a substantially square or semi-circular cross-section.

The device and method of the present invention are further exemplified with the following examples.

EXAMPLE 1

Referring to FIG. 1, a sodium alginate solution 3 containing 0.5% w/v calcium carbonate suspension is introduced into first delivery conduit 2. A 50 mM acetic acid solution in sunflower oil 9 is introduced into inlets (I) of the first 7 and second 8 reagent fluid conduits. Sunflower oil 6 is introduced into first 4 and second 5 barrier fluid conduits. The barrier fluid (in this case, sunflower oil) and the fluid containing the second reagent (sunflower oil containing acetic acid) are delivered to junction region 14 via first 11 and second 13 lateral delivery conduits. The sodium alginate solution 3 is immiscible with the sunflower oil 9 and the barrier fluid 6 and so spherical segments are formed at the junction region 14. The segments are then carried down the functional conduit 15. The sunflower oil 6 provides a barrier between the calcium carbonate and the acetic acid. It is believed that there is initially a concentration gradient across the sunflower oil 6 acting as a barrier fluid. Driven by the concentration gradient, the acetic acid appears to diffuse from the sunflower oil 9 containing acetic acid, across the sunflower oil 6 acting as a barrier fluid to the alginate solution 3. The calcium carbonate reacts with the acetic acid releasing calcium ions in accordance with Reaction scheme 1 shown below.

Reaction scheme 1

$$CaCO_3 + 2H^+ \longrightarrow Ca^{2+} + CO_2 + H_2O$$

The calcium ions are exchanged with the sodium ions in the alginate, cross linking the alginate chains causing a solid bead to be formed.

COMPARATIVE EXAMPLE 1

In the absence of the sunflower oil barrier fluid, the carbonate-containing alginate solution 3 and the acetic acid-containing sunflower oil 9 come into contact with one another at the junction region 14, the acid and carbonate species reacting almost immediately, therefore causing a gel to form at the junction region 14. This causes the device to block and become unusable.

EXAMPLE 2

A sodium alginate solution 3 is introduced into first delivery conduit 2. Octanol 9 containing 53 mM calcium nitrate tetrahydrate and 5 mM calcium cyclohexanebutyrate is introduced into first 7 and second 8 reagent fluid conduits. Octanol 6 is introduced into first 4 and second 5 barrier fluid conduits. The barrier fluid (in this case, octanol) and the fluid containing the second reagent (octanol containing calcium compounds) are delivered to junction region 14 via first 11 and second 13 lateral delivery conduits. The sodium alginate solution 3 is immiscible with the octanol 9 and barrier fluid 6 and so spherical segments are formed at the junction 14. The segments are then carried down the functional conduit 15. The octanol 6 provides a barrier between the alginate species and the calcium ions in the calcium-containing octanol 9. It is believed that there is initially a concentration gradient across the octanol 6 acting as a barrier fluid. Driven by the concentration gradient, the calcium ions appear to diffuse from the octanol 9 containing calcium ions, across the octanol barrier fluid 6 to the alginate solution 3.

The calcium ions are exchanged with the sodium ions in the alginate, cross linking the alginate chains causing a solid bead to be formed.

COMPARATIVE EXAMPLE 2

In the absence of the barrier fluid, the alginate solution 3 and octanol 9 containing calcium ions come into contact with each other at the junction region 14, the calcium ions and alginate species reacting almost immediately, therefore causing a gel to form at the junction region 14. This causes the device to block and become unusable.

Figure 3:
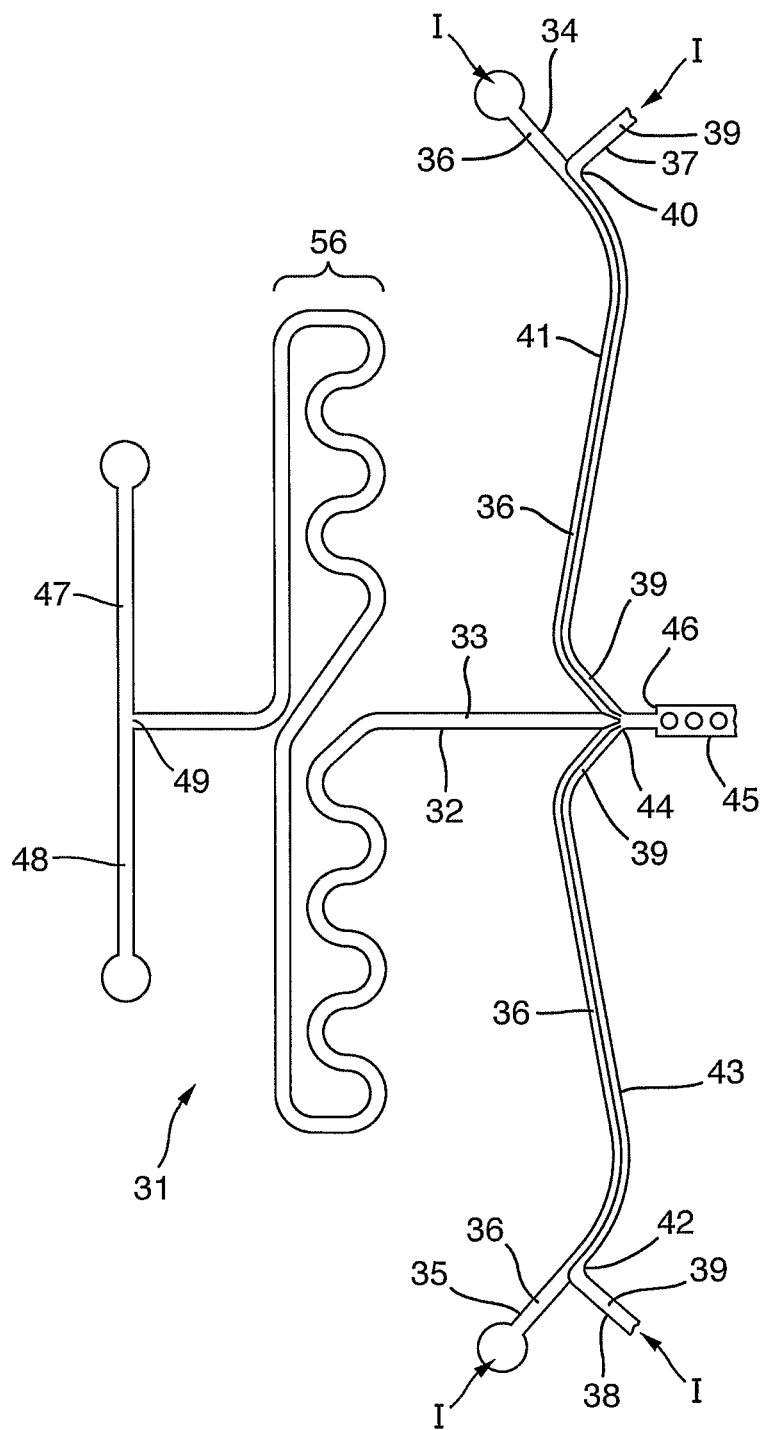
FIG. 3 shows an alternative embodiment of a device in accordance with the first aspect of the present invention.

An alternative embodiment of a device in accordance with the present invention is shown in FIG. 3. FIG. 3 shows a microfluidic reactor device in accordance with the first aspect of the present invention.

The reactor device 31 comprises a first delivery conduit 32 for delivering a first fluid 33 providing a first reagent (not shown), and first 41 and second 43 lateral delivery conduits confluent with the first delivery conduit 32 at a junction region 44, for delivering a second fluid 39 providing a second reagent (not shown). The first 41 and second 43 lateral delivery conduits each comprise an inlet (I) for the second reagent and an inlet (I) for a barrier fluid 36, and the device is so arranged that it permits the barrier fluid 36 to form a barrier between the first reagent and the second reagent.

The operation of the device is now described in more detail with reference to FIG. 3. A first fluid 33 providing a first reagent (not shown) is introduced into first delivery conduit 32. The first reagent is potentially reactive with a second reagent (not shown) provided by a second fluid 39. Barrier fluid 36 is introduced into first 34 and second 35 barrier fluid conduits via inlets (I). Likewise, second fluid 39 is introduced into first 37 and second 38 reagent fluid conduits. The flows of first, second and barrier fluid are substantially laminar. The respective barrier fluid conduits 34, 35 meet respective reagent fluid conduits 37, 38 at junctions 40, 42. Laminar flows of barrier fluid 36 and second fluid 39 are then urged along the first 41 and second 43 lateral delivery conduits as indicated in FIG. 1. The first 41 and second 43 lateral delivery conduits meet the first delivery conduit 32 at a junction region 44.

Figure 3A:
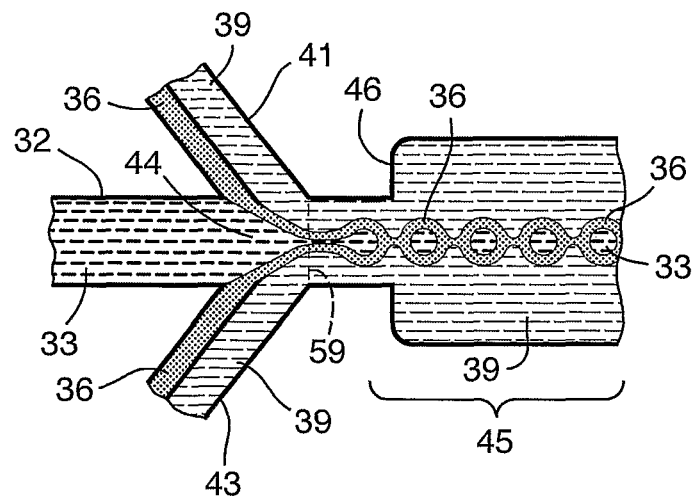
FIG. 3a shows a region of the device of FIG. 3 in greater detail.

Referring to FIG. 3a, the junction region 44 acts as a flow constriction, and a cone-like or wedge-like formation of first fluid 33 is produced, with barrier fluid 36 encasing this formation. Droplets of first fluid 33, encased by barrier fluid 36 are formed in a flow of second fluid 39 in a functional conduit 45. Droplets are formed because first fluid 33 is immiscible with second fluid 39 and barrier fluid 36. These droplets are then transported along the functional conduit 45. In the functional conduit 45, one (or alternatively none or both) of the first and second reagents is transported across the barrier fluid 36 so that the first and second reagents come into reactive contact with one another and undergo a reaction. The composition and thickness of the barrier fluid 36 around the droplets of first fluid 33 will help to control the reaction between the first and second reagents.

The part of the device 31 around the junction region 44 is shown in more detail in FIG. 3a. The functional conduit 45 is provided with an enlargement 46 in cross-section a short distance downstream of the junction region 44. This short distance between the downstream end of the junction region marked by dotted line 59 and the enlargement in cross-section is about half the depth of the functional conduit 45 downstream of the enlargement 46. This enlargement in cross-section promotes the formation of droplets. The enlargement 46 also produces a drop or step in the functional conduit 45; it is expected that the drop or step is beneficial to the formation of droplets.

Referring again to FIG. 3, the device 31 further comprises inlet conduits 47, 48 associated with the first delivery conduit 32, the inlet conduits 47, 48 merging at a junction 49 to form the first delivery conduit 32. This allows two miscible components to be added via inlet conduits 47, 48. The first delivery conduit 32 is provided with a portion 56 comprising a series of bends. The bends assist in the mixing of the miscible components.

The device essentially operates as described above with reference to FIG. 1.

Figure 4:
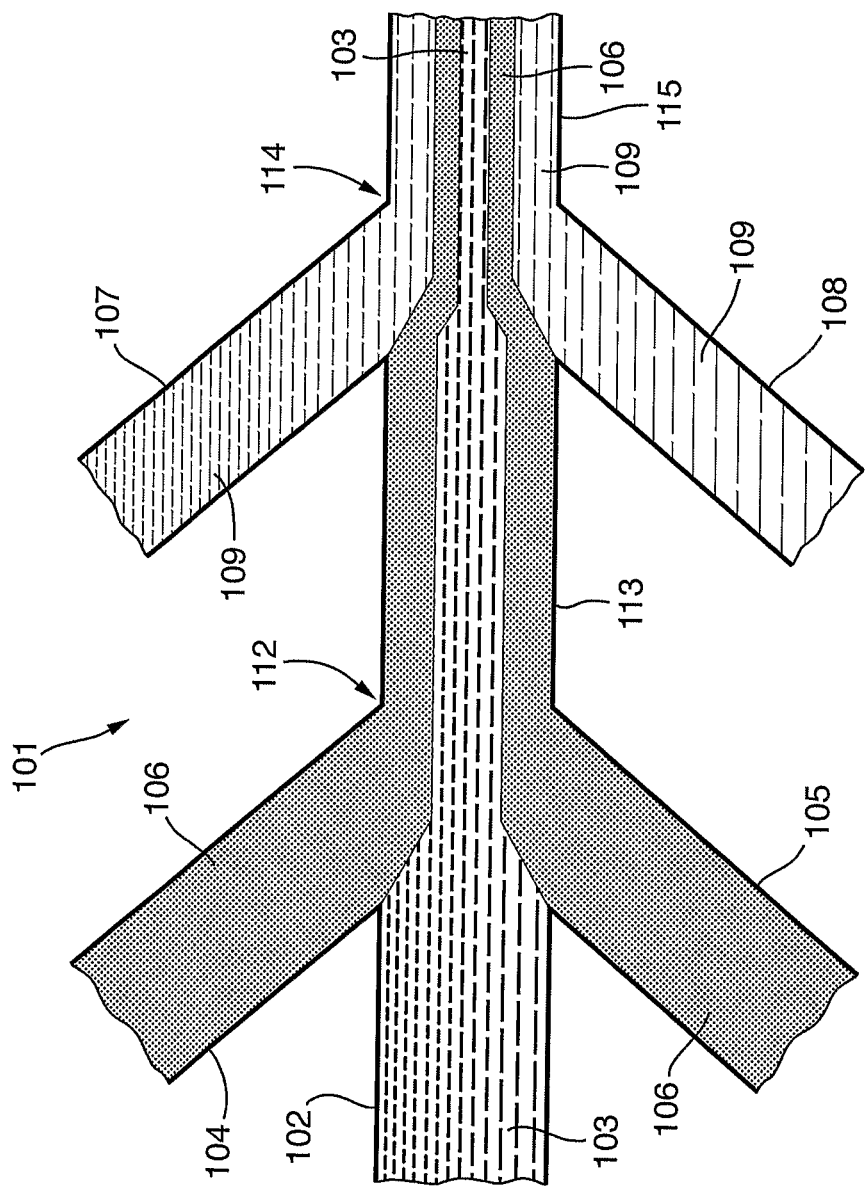
FIG. 4 is a schematic representation of a device in accordance with the second aspect of the present invention.

A further alternative embodiment of the present invention is described with reference to FIG. 4. FIG. 4 shows a microfluidic reactor device 101 for controlling a reaction between a first reagent and a second reagent, the device comprising a first delivery conduit 102 for delivering a first fluid 103 providing a first reagent (not shown). The device 101 further comprises first 104 and second 105 lateral delivery conduits for delivering a barrier fluid 106. The first 104 and second 105 lateral delivery conduits are confluent with the first delivery conduit in a junction region 112, from which extends a first encased flow conduit 113, the device being so arranged as to permit the barrier fluid 106 to encase or sandwich the first fluid 103. The device further comprises third 107 and fourth 108 lateral delivery conduits for delivering a second fluid 109 providing a second reagent (not shown). The third 107 and fourth 108 lateral delivery conduits are confluent with the first encased flow conduit 113 at a junction region 114, this junction being arranged so as to permit the barrier fluid 106 to form a barrier between the first fluid 103 and the second fluid 109.

This configuration is of particular use when the first fluid 103 and second fluid 109 are miscible, and may be used to produce a parallel flow of first fluid 103 sandwiched or encased by barrier fluid 106.

A further alternative embodiment of the present invention is described with reference to FIG. 5. FIG. 5 shows a microfluidic reactor device 201 for controlling a reaction between a first reagent and a second reagent, the device comprising a first inner delivery conduit 202 for delivering a first fluid 203 providing a first reagent (not shown), and a first outer delivery conduit 204 for delivering a barrier fluid 206. The first inner delivery conduit 202 and the first outer delivery conduit 204 are each provided with outlets (denoted "e") in fluid communication with a first encased flow conduit 210, arranged so as to permit barrier fluid 206 to encase or sandwich the first fluid 203 in the first encased flow conduit 210. The device 201 further comprises a second outer delivery conduit 207 for delivering a second fluid 209 providing a second reagent (not shown). The first encased flow conduit 210 forms a second inner delivery conduit extending inside the second outer delivery conduit 207. The first encased flow conduit 210 and the second outer delivery conduit 207 each have outlets (denoted "f"), arranged so as to permit the barrier fluid 206 to form a barrier between the first fluid 203 and the second fluid 209.

This configuration is of particular use when the first fluid 203 and second fluid 209 are miscible, and may be used to produce a parallel flow of first fluid 203 sandwiched or encased by barrier fluid 206.

Those skilled in the art will realise that it is possible to replace the arrangement of the first outer delivery conduit (for delivery of the barrier fluid) and the first inner delivery conduit (for delivery of the first reagent in the presence of the first fluid) with the junction arrangement 112 of FIG. 4. Likewise, it is also possible to replace the arrangement of the first encased flow conduit and the second outer delivery conduit with the junction arrangement 114 of FIG. 4.

Figure 6:
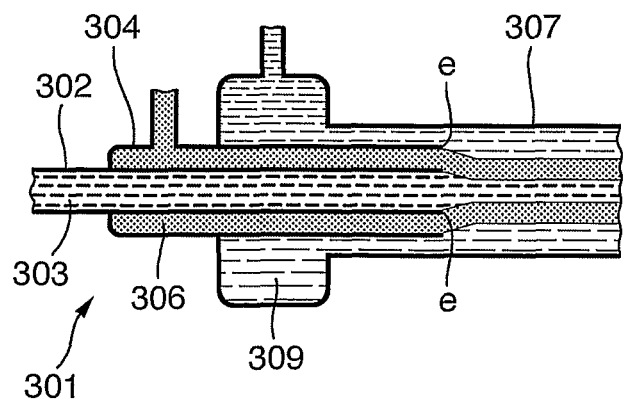
FIG. 6 is a schematic representation of a device in accordance with the sixth aspect of the present invention.

A further alternative device in accordance with the sixth aspect of the present invention is shown in FIG. 6. FIG. 6 shows a microfluidic device 301 for controlling a process (preferably a reaction) between a first reagent (not shown) and a second reagent (not shown), the device 301 comprising a first inner delivery conduit 302 carrying a first fluid 303 providing the first reagent. The device 301 further comprises a first outer delivery conduit 304 carrying a barrier fluid 306 and a second outer delivery conduit 307 carrying a second fluid 309 providing the second reagent. The first inner delivery conduit 302 is located inside the first outer delivery conduit 304, and the first outer delivery conduit 304 is located inside the second outer delivery conduit 307 so as to permit the barrier fluid 306 to form a barrier between the first reagent and the second reagent. The ends of the first inner and outer delivery conduits are marked "e".

This configuration is of particular use when the first fluid 303 and second fluid 309 are miscible, and may be used to produce a parallel flow of first fluid 303 sandwiched or encased by barrier fluid 306.

The invention claimed is:

1. A method of controlling a chemical process involving a first reagent and a second reagent, the method comprising the steps of:
   (i) providing a laminar flow of a first fluid, the first fluid providing said first reagent (or one or more precursor thereof), a laminar flow of a second fluid, the second fluid providing said second reagent (or one or more precursor thereof) and a laminar flow of barrier fluid; and
   (ii) causing the first and barrier fluids to contact one another so that the barrier fluid forms a barrier between the first reagent (or one or more precursor thereof) and the second reagent (or one or more precursor thereof)
   wherein step (ii) comprises forming segments comprising the first fluid and the barrier fluid, the first fluid being encased or sandwiched by the barrier fluid, the segments being surrounded by the second fluid, and the barrier fluid is permeable to one or both of the first and second reagents (or said one or more precursors thereof).

2. A method according to claim 1 comprising causing the first fluid to be encased or sandwiched by the barrier fluid prior to the formation of segments.

3. A method according to claim 2 comprising encasing or sandwiching the first fluid with the barrier fluid prior to encasing or sandwiching the barrier fluid with the second fluid.

4. A method according to claim 2 comprising bringing the barrier fluid into contact with the second fluid before encasing or sandwiching the first fluid with the barrier fluid.

5. A method according to claim 1 comprising providing a plurality of laminar flows of barrier fluid, the laminar flows of barrier fluid contacting the first fluid from more than one side.

6. A method according to claim 1 comprising providing a plurality of laminar flows of second fluid.

7. A method according to claim 6 wherein each laminar flow of second fluid is associated with a laminar flow of barrier fluid.

8. A method according to claim 1 comprising providing a microfluidic device having a junction region in which the barrier fluid may be brought into contact with the first fluid, the junction being arranged to permit the barrier fluid to meet the first fluid from more than one side.

9. A method according to claim 1 comprising providing a microfluidic device having a first reagent conduit, and first and second lateral reagent conduits, the first and second lateral reagent conduits being confluent with the first reagent conduit in a junction region.

10. A method according to claim 1 used in the control and performance of one or both of polymerisation reactions and acid-base reactions.

11. A method according to claim 1 wherein the barrier fluid comprises the second fluid which is at least initially devoid of the second reagent (or one of more precursor thereof).

12. A method according to claim 1 wherein the flow rate of the second fluid is greater than the flow rate of the barrier fluid which is greater than the flow rate of the first fluid.

13. A method according to claim 1 wherein the first fluid provides a precursor of the first reagent and step (i) further comprises providing a laminar flow of a fourth fluid providing another precursor of the first reagent, the laminar flow of the first fluid and the laminar flow of the fourth fluid being parallel laminar flows prior to step (ii), the first and fourth fluids being in contact with one another.

14. A method of making solid segments, the method comprising:
(i) providing a laminar flow of a first fluid provided with a first reagent (or one or more precursors thereof);
(ii) providing a laminar flow of a second fluid provided with a second reagent (or one or more precursors thereof), the first and second reagents reacting so as to lead to the formation of solid segments, the first and second fluids being mutually immiscible;
(iii) providing a laminar flow of a barrier fluid which is permeable to the second reagent (or one or more precursors thereof);
(iv) causing the first and barrier fluids to contact one another so that the barrier fluid forms a barrier between the first reagent (or one or more precursor thereof) and the second reagent (or one or more precursor thereof);
(v) causing the formation of segments of the first fluid encapsulated by the barrier fluid, the segments being surrounded by the second fluid.

15. A method according to claim 1 or claim 14 wherein the barrier fluid is at least initially substantially devoid of said first reagent (or one or more precursor thereof) and said second reagent (or one or more precursor thereof).

16. A method of controlling a chemical process, the method comprising the steps of:
(i) providing a laminar flow of a first fluid, the first fluid providing a first species (selected from a first reagent and one or more precursor thereof), a laminar flow of a second fluid, the second fluid providing a second species (selected from a second reagent and one or more precursor thereof) and a laminar flow of barrier fluid; and
(ii) causing the first and barrier fluids to contact one another so that the barrier fluid forms a barrier between the first species (or one or more precursor thereof) and the second species (or one or more precursor thereof),
wherein step (ii) comprises forming segments comprising the first fluid and barrier fluid, the first fluid being encased or sandwiched by the barrier fluid, the segments being surrounded by the second fluid, and the barrier fluid is permeable to one or both of the first and second species.

17. A method according to claim 16 wherein the barrier fluid is at least initially substantially devoid of the first species and second species.

* * * * *